US012386424B2

(12) United States Patent
Qi et al.

(10) Patent No.: US 12,386,424 B2
(45) Date of Patent: Aug. 12, 2025

(54) CHINESE CHARACTER WRITING AND DECODING METHOD FOR INVASIVE BRAIN-COMPUTER INTERFACE

(71) Applicant: ZHEJIANG UNIVERSITY, Zhejiang (CN)

(72) Inventors: Yu Qi, Hangzhou (CN); Xiaomeng Yang, Hangzhou (CN); Yueming Wang, Hangzhou (CN); Junming Zhu, Hangzhou (CN); Jianmin Zhang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 18/858,732

(22) PCT Filed: Aug. 26, 2024

(86) PCT No.: PCT/CN2024/114453
§ 371 (c)(1),
(2) Date: Oct. 21, 2024

(87) PCT Pub. No.: WO2025/112713
PCT Pub. Date: Jun. 5, 2025

(65) Prior Publication Data
US 2025/0181160 A1    Jun. 5, 2025

(51) Int. Cl.
*G06F 3/01* (2006.01)
*G06V 30/226* (2022.01)

(52) U.S. Cl.
CPC .......... *G06F 3/015* (2013.01); *G06V 30/2276* (2022.01)

(58) Field of Classification Search
CPC .......................... G06F 3/015; G06V 30/2276
See application file for complete search history.

(56) References Cited

U.S. PATENT DOCUMENTS

| 6,681,044 B1* | 1/2004 | Ma | G06V 30/16 382/190 |
| 8,810,522 B2* | 8/2014 | Tse | G06F 3/04883 715/702 |

(Continued)

FOREIGN PATENT DOCUMENTS

| CN | 108983972 A | * 12/2018 |
| CN | 112207816 | 1/2021 |

(Continued)

*Primary Examiner* — William Lu
(74) *Attorney, Agent, or Firm* — Jiwen Chen; Joywin IP Law PLLC (57) ABSTRACT

Disclosed in the present invention is a method for decoding Chinese character writing for an invasive brain-computer interface. In a practical application, a corresponding motor neural signal is divided into two states of a writing stroke and a writing stroke break in view of inconsistency of the writing stroke and the writing stroke break during Chinese character writing, and different filters are trained. A hidden markov model (HMM algorithm) and a Viterbi algorithm are used to judge a task state of the motor neural signal, and the corresponding signal is put into a corresponding decoder. The present invention effectively reduces influence of difference of neural data in different states on the decoder, and improves the performance and robustness of the decoder.

8 Claims, 2 Drawing Sheets (56) References Cited

U.S. PATENT DOCUMENTS

| | | | | |
|---|---|---|---|---|
| 10,860,630 B2* | 12/2020 | Blouw | | G06F 16/9024 |
| 11,461,618 B2* | 10/2022 | Sussillo | | G06N 3/04 |
| 11,625,014 B2* | 4/2023 | Oxley | | G06F 3/015 |
| | | | | 700/83 |
| 11,640,204 B2* | 5/2023 | Shenoy | | G06N 3/044 |
| | | | | 345/156 |
| 12,106,208 B2* | 10/2024 | Pan | | G06N 3/049 |
| 12,219,254 B2* | 2/2025 | Perrone | | H04N 23/683 |
| 2010/0070268 A1* | 3/2010 | Sung | | G10L 15/24 |
| | | | | 704/226 |
| 2012/0033874 A1* | 2/2012 | Perronnin | | G06V 30/245 |
| | | | | 382/187 |
| 2015/0035778 A1* | 2/2015 | Hirakawa | | G06F 3/04845 |
| | | | | 345/173 |
| 2015/0091791 A1* | 4/2015 | Segal | | A61B 5/374 |
| | | | | 345/156 |
| 2016/0192858 A1* | 7/2016 | Min | | A61B 5/316 |
| | | | | 600/545 |
| 2017/0020447 A1* | 1/2017 | Grossman | | A61B 5/7253 |
| 2017/0347906 A1* | 12/2017 | Intrator | | A61B 5/7264 |
| 2018/0005105 A1* | 1/2018 | Schaeffer | | G06F 18/295 |
| 2018/0221661 A1* | 8/2018 | Choe | | A61M 21/02 |
| 2020/0082153 A1* | 3/2020 | Holden | | G06V 40/388 |
| 2020/0206503 A1* | 7/2020 | Ganzer | | A61N 1/36031 |
| 2021/0064135 A1* | 3/2021 | Shenoy | | G06N 3/044 |
| 2021/0290142 A1* | 9/2021 | Vialatte | | A61B 5/374 |
| 2021/0365115 A1* | 11/2021 | Ambeck-Madsen | | |
| | | | | A61B 5/7275 |
| 2022/0055211 A1* | 2/2022 | Wang | | B25J 9/163 |
| 2022/0208173 A1* | 6/2022 | Chang | | A61B 5/37 |
| 2022/0301563 A1* | 9/2022 | Chang | | G10L 15/24 |
| 2023/0029057 A1* | 1/2023 | Lin | | G06N 3/08 |
| 2023/0072423 A1* | 3/2023 | Osborn | | G16H 20/30 |
| 2023/0244909 A1* | 8/2023 | Qi | | G06N 7/01 |
| | | | | 706/25 |
| 2023/0253104 A1* | 8/2023 | Serruya | | A61B 5/369 |
| | | | | 623/25 |
| 2023/0289575 A1* | 9/2023 | Qi | | G06N 3/088 |
| 2023/0315203 A1* | 10/2023 | Wei | | G16H 20/30 |
| | | | | 702/19 |
| 2023/0419703 A1* | 12/2023 | Bathiche | | G06V 30/222 |

FOREIGN PATENT DOCUMENTS

| | | | | |
|---|---|---|---|---|
| CN | 113504828 | | 10/2021 | |
| CN | 115617180 | | 1/2023 | |
| CN | 116705237 | | 9/2023 | |
| CN | 116880691 | | 10/2023 | |
| CN | 116880691 A | * | 10/2023 | |
| CN | 117389441 A | * | 1/2024 | |
| CN | 117608399 A | * | 2/2024 | G06F 18/10 |
| CN | 117608400 A | * | 2/2024 | |
| CN | 117851769 A | * | 4/2024 | |
| WO | WO2022165832 | | 8/2022 | |

* cited by examiner

CHINESE CHARACTER WRITING AND DECODING METHOD FOR INVASIVE BRAIN-COMPUTER INTERFACE

FIELD OF TECHNOLOGY

The present invention relates to the field of brain-computer interface signal decoding, in particular to a method for decoding Chinese character writing for an invasive brain-computer interface.

BACKGROUND TECHNOLOGY

A brain-computer interface (BMI) system is intended to restore a part of motion functions and re-establish special sensations in patients with paralysis, mainly by recording neuronal activities from a brain and converting them into external motion control instructions, such as a prosthetic, a computer cursor. Through brain-computer interface technology, humans are capable of expressing ideas or manipulating devices through brains, which can effectively improve the ability of patients with physical disabilities to communicate with the outside world and control the external environment, and greatly improve the quality of lives of the patients.

For example, a Chinese patent document with the publication number CN102309380A discloses a smart wheelchair based on a multi-modal brain-computer interface, which converts control intentions of a subject into instructions and transmits them to a communication unit of a control module, and then controls the wheelchair through a controller.

A Chinese patent document with the publication number CN114366122A discloses a motion imagination analysis method based on an electroencephalography (EEG) brain-computer interface, which uses the EEG brain-computer interface to obtain raw EEG data, estimates imagined limb movements of a subject through real-time analysis of the data, and helps the subject complete the imagined limb movements through traction of a motion auxiliary device.

Writing is an important means of human communication, but some diseases may cause people with disabilities to lose ability to write. Recent brain-computer interface researches have brought great hope for disabled people to restore the writing ability, and in 2021, a team of Willett firstly proposed a handwriting English research based on an invasive brain-computer interface, and achieved a remarkable result. In their trial, a stroke patient who had lost the ability to write imagined handwritten English letters, spelling them at 90 characters per minute with 98.78 percent accuracy. However, their work is based on English letters with simple classification structures and few strokes, and it is difficult to directly apply their proposed decoding framework to a language such as Chinese characters with complex structures and many strokes. When writing the Chinese characters, a writing stroke and a writing stroke break are two different states. Due to plasticity of neurons, a brain activity pattern would change according to different behavior states. The above changes would make a mapping function of a neural signal to a motion signal unstable, resulting in inaccurate decoding results.

SUMMARY OF THE INVENTION

The present invention provides a method for decoding Chinese character writing for an invasive brain-computer interface. According to two different neural representations of a writing stroke and a writing stroke break in a writing process, a state discriminator is designed to decode neural data in different states separately, greatly reducing instability of neural signals when performing different tasks, and improving robustness of a decoder.

A method for decoding Chinese character writing for an invasive brain-computer interface, comprising the following steps:
(1) acquiring an original motor neural signal, filtering the signal to obtain a neural signal with a specified frequency band, and further processing the obtained neural signal to obtain an ESA neural signal;
(2) standardizing the ESA neural signal, truncating motor neural signals of data segments with a set window length, and constructing a training data set;
(3) in the training data set, according to Chinese character stroke motion signals and a Chinese character stroke break motion signals of Chinese character writing motion signals, dividing corresponding motor neural signals into writing stroke motor neural signals and writing stroke break motor neural signals, wherein the motor neural signals correspond to the Chinese character writing motion signals;
(4) using the motor neural signals and the Chinese character writing motion signals as inputs, and training the following three models: 1) using the writing stroke motor neural signals and corresponding character stroke motion signals to train a predictor for decoding Chinese character strokes; 2) using the writing stroke break motor neural signals and corresponding character stroke break motion signals to train a predictor for decoding Chinese character stroke breaks; and 3) using the writing stroke motor neural signals and the writing stroke break motor neural signals to train a state discriminator for distinguishing a writing stroke and a writing stroke break during the Chinese character writing; and
(5) during application, inputting a motor neural signal to be decoded into the state discriminator, inputting a neural signal of the discriminated writing character strokes into the predictor for decoding Chinese character strokes, and inputting a neural signal of the discriminated writing character stroke breaks into the predictor for decoding Chinese character stroke breaks; and combining the decoded stroke motion signal and the decoded stroke break motion signal to obtain a complete decoded Chinese character motion signal.

A specific process of step (1) is as follows:
a neural activity is amplified and digitized by a Neuroport system and recorded at a frequency of 30 KHz; the recorded neural signal is firstly filtered through a first-order Butterworth filter with a cut-off frequency being set to 300 Hz to obtain a neural signal above 300 Hz; and then the neural signal is subjected to full wave rectification, is subjected to the first-order Butterworth filter again with the cut-off frequency being set to 12 Hz, and then is downsampled at 1000 Hz to obtain the ESA neural signal.

When collecting a Chinese character data set in step (1), a Chinese character writing paradigm used is an MP4 format, and a trial process may be played in full screen in which a background is pure black, a character right in the middle of a screen is in a green italic type, and a size of the italic-type character may be set to 600*600, and the paradigm comprises 4 states which are "Prepare", "Reaction", "Go", and "Delay" in order. The "Go" state is a handwritten Chinese character state, in which a right hand holding a chalk traces a Chinese character and guides a volunteer to imagine a handwritten Chinese character.

The data in step (2) is the ESA type neural signal obtained after processing in step (1). As a preferred option, the data of paradigm preparation and return stages may be removed, and an actual operation stage may be selected for analysis.

For the standardization and smoothing operation, a z-score function and a movmean function in Matlab may be used to smooth a neuronal activity of each channel of neural signal, and a specific smoothing window size may be selected according to actual needs.

In step (3), a specific process of the dividing corresponding motor neural signals into writing stroke motor neural signals and the writing stroke break motor neural signals is as follows:

Chinese writing track data (the Chinese writing motion signals) comprises speed data in an x direction and a y direction, as well as a length of each stroke and stroke break of each Chinese character, wherein a stroke state is represented as 1, and a stroke break state is represented as 0; according to the stroke state and the stroke break state, the corresponding motor neural signals are divided into the writing stroke motor neural signals and the writing stroke break motor neural signals, and the corresponding writing stroke motor neural signals and the corresponding writing stroke break motor neural signals are combined together respectively in order so as to obtain two arrays $Spike_s$ and $Spike_b$, wherein $Spike_s$ is a motor neural signal array corresponding to the writing strokes, and $Spike_b$ is a motor neural signal array corresponding to the writing stroke breaks.

In step (4), an input format of the motor neural signals is as follows:

Trial*Timebin*Electrode wherein Trial is the number of corresponding Chinese characters, Timebin is a length of time corresponding to a neural signal for each Chinese character, and Electrode is the number of signal acquisition electrode channels.

Both the predictor for decoding Chinese character strokes and the predictor for decoding Chinese character stroke breaks adopt a Kalman filter; and the state discriminator for distinguishing a writing stroke and a writing stroke break adopts an HMM decoder, which uses a Viterbi algorithm to solve a state sequence.

An input of the state discriminator for distinguishing a writing stroke and a writing stroke break is a complete neural signal during the Chinese character writing, and an output thereof is a state sequence of the writing strokes and the writing stroke breaks in a specific format of [1111 . . . 0000 . . . 1111 . . . ], wherein 1 represents a writing stroke state and 0 represents a writing stroke break state.

A specific process of step (5) is as follows:

the motor neural signal to be decoded is input into the state discriminator for distinguishing a writing stroke and a writing stroke break, and the length of each stroke or stroke break is obtained according to the predicted state sequence of the writing strokes and stroke breaks so as to obtain a length sequence of writing strokes and stroke breaks;

prediction values of strokes and prediction values of stroke breaks are obtained by inputting the corresponding motor neural signals into the predictor for decoding Chinese character strokes and the predictor for decoding Chinese character stroke breaks respectively; and according to the length sequence of writing strokes and stroke breaks, the predicted values of strokes and stroke breaks are combined according to [stroke, stroke break, stroke, . . . , stroke break, stroke] to obtain a complete decoded Chinese character motion speed signal, and a Chinese character motion position signal is obtained by integrating the motion speed signal.

Compared with the prior art, the present invention has the following beneficial effects:

1. In the present invention, according to two different neural representations of a writing stroke and a writing stroke break in a writing process, a state discriminator is designed to decode neural data in different states separately, greatly reducing instability of neural signals when performing different tasks, and improving robustness of a decoder.
2. Based on the traditional Kalman filter and HMM decoder, the present invention proposes a method for decoding Chinese character writing for an invasive brain-computer interface, which reduces the influence caused by the instability of neural signals when executing different writing tasks to a certain extent, and is superior to a single Kalman filter algorithm in testing, and proves the effectiveness of the method.

DESCRIPTION OF THE EMBODIMENTS

The present invention is described in further detail below in conjunction with the attached drawings and embodiments. It should be noted that the embodiments below are intended to facilitate the understanding of the present invention and do not have any limiting effect on it.

A single clinical data set is used in this study. All clinical and trial procedures in this study are approved by the Medical Ethics Committee of the Second Affiliated Hospital of Zhejiang University (Ethics Review No. 2019-158). Informed consent forms are orally obtained by participants and their immediate family members and signed by their legal representatives. A volunteer is a 75-year-old man who was in a car accident four years ago and is quadriplegic after a C-4 cervical trauma. The volunteer could only move himself from neck up and has normal language skills and comprehension of all tasks. For a limb motion behavior, the patient has a skeletal muscle strength score of 0/5 and a complete loss of limb motion control.

Two 96-channel Utah intra-cortex microelectrode arrays (4 mm×4 mm, 1.4 mm long Utah arrays, Blackrock Microsystems, Salt Lake City, Utah, USA) are implanted in a left primary motion cortex of the volunteer, one located in a central hand knot area and the other one located 2 mm away. The implant uses electronic computed tomography and functional magnetic resonance imaging to guide the implant. During the implant, the participant is asked to perform elbow and elbow flexion and extension exercises, and functional magnetic resonance imaging scan is used to identify an activated area of the motion cortex. A robotic arm is used to implant electrodes during a surgery. The participant is given a week to recover before beginning the neural signal recording and BCI training tasks.

The participant performs the BCI training tasks on three weekdays per week for approximately three hours per day, comprising preparation of signal recording, impedance testing, spike potential classification, and paradigm tasks. Once the participant feels tired or develops an abnormal physical condition (such as a fever or urinary tract infection), the trial is stopped. The whole trial lasts for half a year, and valid data used in the present invention totals 5 days.

The task of writing Chinese characters is performed on a display of a computer which is 1.5 meters in front of the volunteer. The task paradigm asks the volunteer to imagine writing on a blackboard with a large right arm holding a piece of chalk. The paradigm is an MP4 format, occupying the entire screen of the display, wherein a target character is written in a center of the screen. The background of the paradigm is pure black, the target character is in a green italic type, and a size of the italic-type character may be set to 600*600, and the paradigm comprises four states which are: "Prepare", "Reaction", "Go" and "Delay". The "Prepare" state lasts for 1s. In this state, a Chinese character to be written by hand is displayed on the screen to remind the volunteer to prepare mentally. The "Reaction" state lasts for 0.3 seconds. In this state, a ding sound is played to remind the volunteer that it is about to start writing. The "Go" state lasts from 3 to 12 seconds, depending on complexity of a character. In this state, a right hand holding a chalk traces the Chinese character and guides a volunteer to imagine a handwritten Chinese character. The "Delay" stage lasts for 0.8s, the screen turns black, and a new Chinese character is about to be written. In the trial, the target characters appear in a random order, and relevant task parameters may be configured in task setting, comprising a size of the target character, a distance from the target character to the top of the screen, and maximum writing time. For each trial, the volunteer is asked to imagine writing on the blackboard with the piece of chalk in a right hand while exerting the right arm.

The present invention provides a method for decoding Chinese character writing for an invasive brain-computer interface. Based on an HMM decoder and a traditional Kalman filter, the different states existing in the writing process are discriminated, and the filter is trained according to the different states of a writing stroke and a stroke break respectively, which reduces the influence caused by instability of neural signals when performing different writing tasks to a certain extent and greatly improves performance of the decoder.

A method for decoding Chinese character writing for an invasive brain-computer interface, comprising the following steps:

(1) motor neural signal preprocessing: acquiring an original motor neural signal from a hardware device, filtering the signal to obtain a specified frequency band of data to be processed, and further processing the obtained neural signal to obtain an entire spiking activity (ESA) neural signal.

Specifically, this example uses a Neuroport system (NSP, Blackrock Microsystems) to record the neural signals. A neural activity is amplified, digitized, and recorded at a frequency of 30 KHz. The recorded neural signal is firstly subjected to a first-order Butterworth filter with a cut-off frequency being set to 300 to obtain a neural signal above 300 Hz. Then it is subjected to full wave rectification, is subjected to the first-order Butterworth filter again with the cut-off frequency being set to 12 Hz, and then is downsampled at 1000 Hz to obtain the ESA neural signal.

Specifically, in a general trial, a trial session collects 30 Chinese characters of different categories, and each Chinese character is written three times, so training set data is 29 Chinese characters *3, and test set data is 1 *1.

Figure 1:
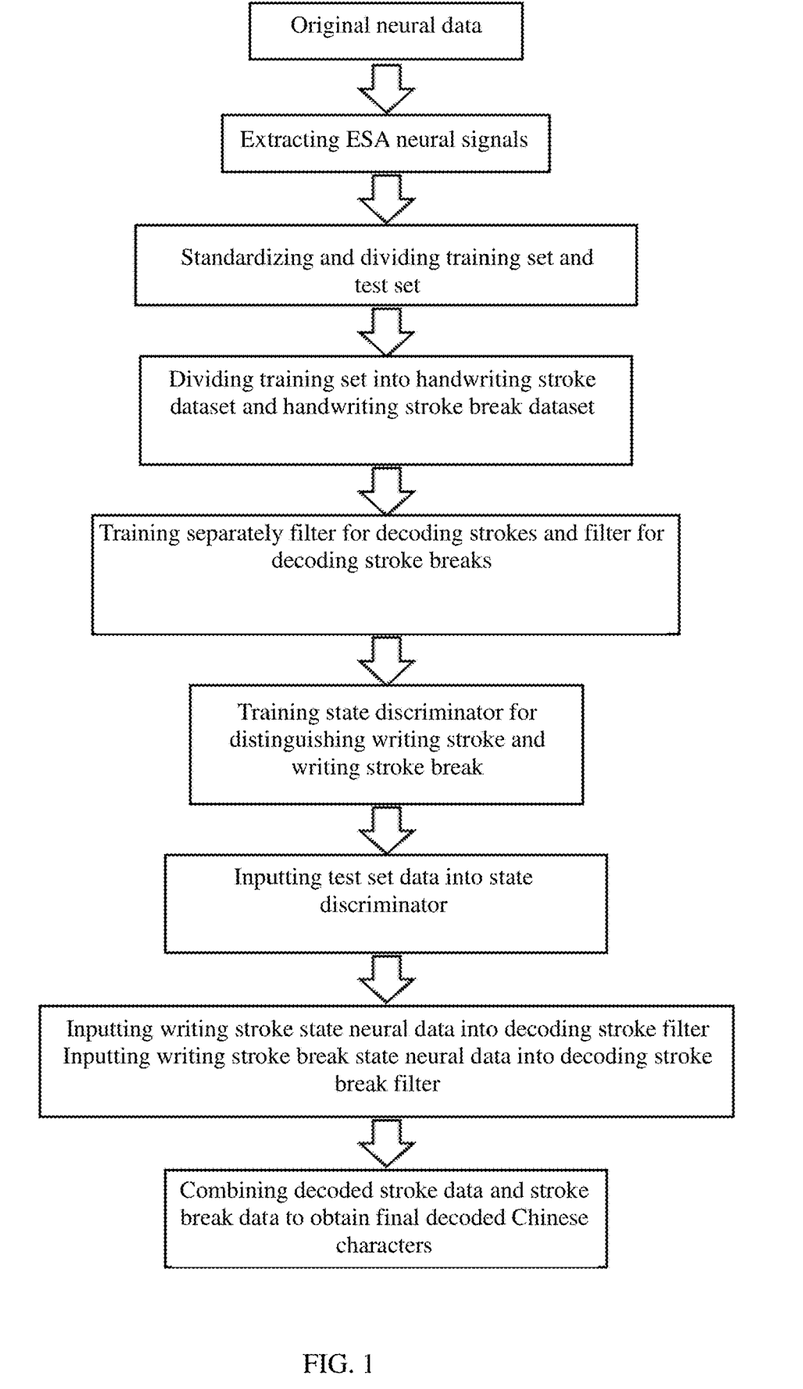
FIG. 1 provides a flow chart of a method for decoding Chinese character writing for an invasive brain-computer interface provided in an embodiment of the present invention.

Specifically, as shown in a paradigm diagram of the method adopted by the present invention in FIG. 1, the task paradigm requires the volunteer to imagine writing on a blackboard with a large right arm holding a piece of chalk. A Chinese character writing paradigm used is an MP4 format, and a trial process may be played in full screen in which a background is pure black, a character right in the middle of a screen is in a green italic type, and a size of the italic-type character may be set to 600*600, and the paradigm comprises 4 states which are "Prepare", "Reaction", "Go", and "Delay" in order. The "Prepare" state lasts for 1s. In this state, a Chinese character to be written by hand is displayed on the screen to remind the volunteer to prepare mentally. The "Reaction" state lasts for 0.3 seconds. In this state, a ding sound is played to remind the volunteer that it is about to start writing. The "Go" state lasts from 3 to 12 seconds, depending on complexity of a character. In this state, a right hand holding a chalk traces the Chinese character and guides a volunteer to imagine a handwritten Chinese character. The "Delay" stage lasts for 0.8s, the screen turns black, and a new Chinese character is about to be written.

(2) standardizing the data, truncating data segments with a suitable window length to obtain the preprocessed neural data, and dividing the data into a training set and a test set according to a reasonable proportion, comprising:

Specifically, in addition to data of paradigm preparation and return stages, an actual operation stage is selected for analysis. In this example, the actual writing stage starts with 3100 ms, and the actual writing stage ends with 8100 ms-12100 ms depending on a length of the Chinese character, that is, the length of the Chinese character in this example is 5 s-9 s.

Specifically, a format of the Chinese character writing motor neural signal is as follows:

Trial*Timebin*Electrode wherein Trial is the number of corresponding Chinese characters, Timebin is a length of time (ms) corresponding to a neural signal for each Chinese character, and Electrode is the number of signal acquisition electrode channels.

Specifically, in this example, 90 Chinese characters are collected every day, i.e. Trial=90.

Timebin is longest time that is required for writing a Chinese character among the characters collected on the day, for example, the longest time that is taken to write the Chinese character is 9 s, then Timebin=3100+9000=12100. In actual calculation, a Chinese character that takes less writing time takes corresponding writing time from a long array. For example, for a Chinese character that takes 5 s to write, a time range from 3100 to 8100 of the array is taken. In this example, Electrode=192, i.e., neural signals corresponding to 192 electrodes are collected.

Specifically, the standardization and smoothing operation is carried out by using a z-score function in Matlab in this example to smooth a neural activity of each channel of neural signal, and a specific smoothing window is set to 5 in this example.

Specifically, a bin operation is performed on the standardized neural data by using a crossed bin mode with a window size of 200 ms and a step size of 50 ms.

Specifically, for data division, writing signals of only one Chinese character category can be used as the test set, and the ones of the remaining Chinese character categories can be used as the training set. The actual test process can be tested by a "leave-one-out" method.

(3) dividing corresponding motor neural signals into writing stroke motor neural signals and writing stroke break motor neural signals according to the Chinese character motion data.

Specifically, the Chinese character motion signals comprise motion data in an x direction and a y direction, as well as a length of each stroke and stroke break of each Chinese character. For example, a total length of a motion signal of character "big" is 80, and a stroke and stroke break sequence is [15, 13, 20, 14, 18], wherein an odd term is a stroke length, and an even term is a stroke break length.

Specifically, the corresponding Chinese character writing motion neural signals are divided into corresponding stroke signals and stroke break signals according to the stroke and stroke break sequence, and the corresponding stroke motor neural signals and the corresponding stroke break motor neural signals are combined together in order to obtain two arrays $Spike_s$ and $Spike_b$, wherein $Spike_s$ is a motor neural signal array corresponding to the writing strokes and $Spike_b$ is a motor neural signal array corresponding to the writing stroke breaks.

(4) using the motor neural signals and the Chinese character writing trace signals as inputs in a training process, and training the following three models: 1) using the writing stroke motor neural signals and corresponding character stroke motion signals to train a predictor for decoding Chinese character strokes; 2) using the writing stroke break motor neural signals and corresponding character stroke break motion signals to train a predictor for decoding Chinese character stroke breaks; and 3) using the neural signals of writing strokes and the neural signals of writing stroke breaks to train a state discriminator for distinguishing a writing stroke and a writing stroke break during the Chinese character writing.

1) using the writing stroke motor neural signals and corresponding Chinese character stroke motion signals to train the predictor for decoding Chinese character strokes.

Preferably, a Kalman filter can be used as a filter to decode Chinese character stroke motions.

Specifically, the Kalman filter is used to decode the handwriting stroke motions according to the writing stroke motor neural signals, and a discharging mode is defined as:

$$z_k = H_k x_k + q_k \quad (1)$$

wherein $z_k \in \mathfrak{R}^C$ represents discharging frequencies of C neurons of written Chinese character strokes observed in time $\Delta t$ at a moment of time $t_k$, k=1, 2, ... C, and $H \in \mathfrak{R}^{C \times 2}$ is a matrix that linearly correlates the state of the hand with the discharging of the neurons.

Specifically, the state of hand motion is equivalent to the trace state of Chinese characters, i.e., $x_k = [p_x, p_y, v_x, v_y, a_x, a_y]_k^T$, represents a position in the y direction, a position in the x direction, a speed in the x direction, a speed in the y direction, an acceleration in the x direction, and the acceleration in the y direction of the Chinese character traces at a moment of time $t_k = k\Delta t$.

Specifically, supposing that a mean value of noise in the observed values is 0 and conforms to a normal distribution, i.e., $q_k \sim N(0, Q_k)$, $Q_k \in \mathfrak{R}^{C \times C}$ A state update equation is as follows:

$$x_{k+1} = A_k x_k + W_k \quad (2)$$

wherein $A_k \in \mathfrak{R}^{2 \times 2}$ is a coefficient matrix, a noise term is $w_k \sim N(0, W_k)$, $W_k \in \mathfrak{R}^{2 \times 2}$. The formula shows that the motion state (speed) of the hand at time k+1 is linearly related to the state at time k. Assuming that these estimates are normally distributed and that $A_k$ and $W_k$ can be learned from the data. In fact, $A_k$, $H_k$, $W_k$, $Q_k$ may change over the number of time steps k. In order to simplify the calculation, they are all constants. Therefore, their values can be estimated from the training data using a least square method.

Since $A_k$, $H_k$, $W_k$, $Q_k$ are independent of each other with respect to k, a subscript is ignored, it is expressed as A, H, W, Q, coefficient matrixes A and H are estimated by using the least square method:

$$A = \arg\min_A \sum_{k=1}^{M-1} \|x_{k+1} - Ax_k\|^2 \quad (3)$$

$$H = \arg\min_H \sum_{k=1}^{M} \|z_k - Hx_k\|^2 \quad (4)$$

wherein $\|\cdot\|$ is a normal $L^2$ paradigm.
Solving equations (3) and (4) gives:

$$A = X_2 X_1^T (X_1 X_1^T)^{-1} \quad (5)$$

$$H = ZX^T (XX^T)^{-1} \quad (6)$$

wherein $$X = \begin{pmatrix} x_{1,1} & \cdots & x_{1,M} \\ \vdots & \ddots & \vdots \\ x_{6,1} & \cdots & x_{6,M} \end{pmatrix}, X_1 = \begin{pmatrix} x_{1,1} & \cdots & x_{1,M-1} \\ \vdots & \ddots & \vdots \\ x_{6,1} & \cdots & x_{6,M-1} \end{pmatrix} \quad (7)$$

$$X_2 = \begin{pmatrix} x_{1,2} & \cdots & x_{1,M} \\ \vdots & \ddots & \vdots \\ x_{6,2} & \cdots & x_{6,M} \end{pmatrix}, Z = \begin{pmatrix} z_{1,1} & \cdots & z_{1,M} \\ \vdots & \ddots & \vdots \\ z_{C,1} & \cdots & z_{C,M} \end{pmatrix} \quad (8)$$

Using the estimated A and H, W and Q are further obtained:

$$W = (X_2 - AX_1)(X_2 - AX_1)^T / (M-1) \quad (9)$$

$$Q = (Z - HX)(Z - HX)^T / M \quad (10)$$

After the parameters A, H, W, Q are obtained, the neuronal peak potential discharging frequency and hand motion can be encoded according to equations (1) and (2).

To reconstruct the hand motion based on neuron discharging in the hand, steps are as follows:

For each $x_k$, reconstruction using the Kalman filter comprises the following two steps:
  i): (a priori step) predicting $x_k$ from state of formula (2). A predicted value is marked as $\hat{x}_k^-$;
  ii): (a posteriori step) updating $\hat{x}_k^-$ using discharging frequency information at a moment of $t_k$. An updated value is marked as $\hat{x}_k$.

To assess estimation capability, a priori error and a posteriori error are defined as follows:

$$e_k^- = x_k - \hat{x}_k^-, e_k = x_k - \hat{x}_k \quad (11)$$

Assuming that $x_k^-$, $x_k \in \mathfrak{R}^6$ are both unbiased estimated values, the priori error and the posteriori error have characteristics of a covariance matrix (in a one-dimensional case, the covariance matrix is simply a square of an Euclidean distance between a true value and an estimated value). The covariance matrix of the priori estimated error and the covariance matrix of the posteriori estimated error are respectively defined as follows:

$$P_k^- = E[e_k^- e_k^{-T}], P_k = E[e_k e_k^T] \quad (12)$$

The posteriori estimators are a final estimation of the state, and in order to simplify the estimation process, we assume that the estimators are all linear, so we can express the posteriori estimation as a linear combination of the priori estimation and a weighted difference between an actual measured value and a measured predicted value, as follows:

$$\hat{x}_k = \hat{x}_k^- + K_k(z_k - H\hat{x}_k^-) \tag{13}$$

wherein $K_k$ is a gain matrix, which is defined as follows:

$$K_k = P_k^- H^T (HP_k^- H^T + Q)^{-1} \tag{14}$$

wherein Q is a measurement error matrix.

Combining all the above formulas, the Kalman filter algorithm is used to reconstruct the hand motion state of writing Chinese characters according to a given discharging frequency of the hand neurons:

I. Discrete Kalman filter time update equation:

At each moment of $t_k$, a priori estimated value is obtained from a previous moment of $t_{k-1}$, and an error covariance matrix is calculated:

$$\hat{x}_k^- = A\hat{x}_{k-1} \tag{15}$$

$$P_k^- = AP_{k-1}A^T + W \tag{16}$$

II. Measured value update formula:

Using the estimated value $\hat{x}_k^-$ and the discharging frequency $z_k$, the estimated values are updated according to formula (11), and the covariance matrix is calculated. The process can be described as:

$$K_k = P_k^- H^T (HP_k^- H^T + Q)^{-1} \tag{17}$$

$$\hat{x}_k = \hat{x}_k^- + K_k(z_k - H\hat{x}_k^-) \tag{18}$$

$$P_k = (I - K_k H) P_k^- \tag{19}$$

At each moment, the Kalman filter is iteratively updated according to the above two steps to solve for the writing stroke motion estimated values.

2) using the writing stroke break motor neural signals and corresponding Chinese character stroke break motion signals to train the predictor for decoding Chinese character stroke breaks.

Specifically, this step is the same as step 1), the writing stroke motor neural signals in step 1) are replaced with the writing stroke break motor neural signals, and the corresponding Chinese character stroke motion signals are replaced with the corresponding Chinese character stroke break motion signals.

3) using the neural signals of writing strokes and the neural signals of writing stroke breaks to train the state discriminator for distinguishing a writing stroke and a writing stroke break during the Chinese character writing.

Specifically, the HMM is used as a state discriminator for distinguishing a writing stroke and a writing stroke break during the Chinese character writing.

Specifically, an emission probability matrix of HMM algorithm is solved using a Gaussian mixture model (GMM) algorithm.

Specifically, four states in the HMM algorithm are set as follows:

A hidden state is set to the writing stroke (s) and the writing stroke break (b).

An observed state corresponds to the writing motor neural signal.

A square matrix with a 2*2 transition probability matrix:

$$A = \begin{vmatrix} a_{ss} & a_{sb} \\ a_{bs} & a_{bb} \end{vmatrix} \tag{20}$$

wherein $a_{ss}$ is a probability that the stroke state changes to the stroke state, and $a_{sb}$ is a probability that the stroke state changes to the stroke break state; and $a_{bs}$ is a probability that the stroke break state changes to the stroke state, and $a_{bb}$ is a probability that the stroke break state changes to the stroke break state.

Specifically, the transition probability matrix is set to:

$$A = \begin{vmatrix} 0.8 & 0.2 \\ 0.5 & 0.5 \end{vmatrix}$$

Specifically, the emission probability is solved using the GMM model:

In the problem of writing Chinese characters, the classification of strokes and stroke breaks is solved using the Gaussian mixture model (GMM), which defines the following information:

$x_j$ represents a $j^{th}$ piece of observed data, j=1, 2, ..., N

K represents the number of sub-Gaussian models in the mixed model, and let K=2 in this problem $a_k$ is a probability that the observed data belongs to a $k^{th}$ sub-model, $$\alpha_k \geq 0, \sum_{k=1}^{K} \alpha_k = 1$$

$\varsigma(x|\theta_k)$ is a Gaussian distribution function of the $k^{th}$ sub-model, $\theta_k = (\mu_k, \sigma_k^2)$ and an expansion form is as follows:

$$P(x|\theta) = \frac{1}{\sqrt{2\prod |\sigma^2}} \exp\left(-\frac{(x-\mu)}{2\sigma^2}\right) \tag{21}$$

j is a probability that the observed data belongs to a kth sub-model.

A probability distribution of the Gaussian mixture model is:

$$P(x|\theta) = \sum_{k=1}^{K} \alpha_k \phi(x|\theta_k) \tag{22}$$

wherein the parameter $\theta = (\widetilde{\mu_k}, \widetilde{\sigma_k}, \widetilde{\alpha_k})$, representing an expectation of each sub-model, a variance, and an occurrence probability in the mixture model.

The observed data $x_j$ is a motor neural signal corresponding to the written Chinese character, and in the two Gaussian distribution sub-models, y is respectively a mean value of the motor neural signal corresponding to the written stroke and a mean value of the motor neural signal corresponding to the written stroke break, and a solving process of p is as follows:

The corresponding Chinese character writing motion neural signals are divided into corresponding stroke signals and stroke break signals according to the stroke and stroke break sequence, and the corresponding stroke motor neural signals and the corresponding stroke break motor neural signals are combined together to obtain two arrays Spike$_s$ and Spike$_b$, wherein Spike$_s$ is a motor neural signal array corresponding to the writing strokes and Spike$_b$ is a motor neural signal array corresponding to the writing stroke breaks, and formats thereof are both two-dimensional:

bin*Electrode

Specifically, bin is a time length (50 ms) of neural signal corresponding to all strokes or stroke breaks in this trial, and Electrode is the number of channels of signal acquisition electrodes, which in this example is 192.

Specifically, by averaging the dimensions of Num and Timebin, Spike$_{ms}$ and Spike$_{mb}$ motor neural signal arrays in a 1*Electrode format are obtained as the mean value μ of the two Gaussian sub-models, respectively.

Specifically, for the Gaussian mixture model above, an EM expectation maximization method is used to solve:

E-step: a probability that each piece of observed data j comes from the sub-model k is calculated according to the current parameters:

$$\gamma_{jk} = \frac{\alpha_k \phi(x_j \mid \theta_k)}{\sum_{k=1}^{K} \alpha_k \phi(x_j \mid \theta_k)}, j = 1, 2, \ldots, N; k = 1, 2, \ldots, K \quad (23)$$

M-step: model parameters of a new iteration are calculated:

$$\mu_k = \frac{\sum_j^N (\gamma_{jk} x_j)}{\sum_j^N \gamma_{jk}}, k = 1, 2, \ldots, K \quad (24)$$

$$\sum k = \frac{\sum_j^N \gamma_{jk}(x_j - \mu_k)(x_j - \mu_k)^T}{\sum_j^N \gamma_{jk}}, k = 1, 2, \ldots, K \quad (25)$$

$$\alpha_k = \frac{\sum_j^N \gamma_{jk}}{N}, k = 1, 2, \ldots, K \quad (26)$$

The E-step and M-step are computed iteratively until a convergence condition is reached.

Thus, the emission probability matrix of HMM process is obtained:

$$B = \begin{vmatrix} b_{11} \\ b_{21} \end{vmatrix} \quad (27)$$

wherein $b_{11}$ is a probability that an observation point is a writing stroke, and $b_{21}$ is a probability that the observation point is a writing stroke break.

Specifically, a Viterbi algorithm can be used to solve the writing stroke and writing stroke break state sequence corresponding to the motor neural signals:

Input: model λ=(A, B, Π) and observed sequence O=(o$_1$, o$_2$, . . . , o$_T$), wherein A and B are a writing stroke and stroke break emission probability matrix and a transition matrix, respectively, Π are initial state values and are set to |1 0|, and by default, the first stroke is a writing stroke.

Solution: the writing stroke and stroke break state sequence corresponding to the writing motor neural signals
1) initializing a local state:

$$\delta_1(i) = \Pi_i b_i(o_1), i=1,2,\ldots,N \quad (28)$$

$$\varphi_1(i) = 0, i=1,2,\ldots,N \quad (29)$$

2) performing dynamic programming recursion time for the local state at a moment of t=2, 3, . . . , T:

$$\delta_t(i) = \max_{1 \le j \le N} [\delta_{t-1}(j) a_{ji}] b_i(o_t), i = 1, 2, \ldots, N \quad (30)$$

$$\varphi_t(i) = \arg \max_{1 \le j \le N} [\delta_{t-1}(j) a_{ji}], i = 1, 2, \ldots, N \quad (31)$$

calculating a maximum $\delta_T(i)$ at time T, i.e., an occurrence probability of a most likely hidden state sequence at a moment of T calculating a maximum $\varphi_T(i)$ at the time T, i.e., a most likely hidden state sequence at the moment of T $$P^* = \max_{1 \le j \le N} \delta_T(t) \quad (32)$$

$$i_T^* = \arg \max_{1 \le j \le N} [\delta_T(i)] \quad (33)$$

4) using a local state φ(i) to start backtracking, for t=T−1, T−2, . . . , 1:

$$i^*_t = \varphi_{t+1}(i^*_{t+1}) \quad (34)$$

and finally obtaining a most likely stroke break sequence I*={i*$_1$, i*$_2$, . . . , i$_T$*}, wherein $$i_T^* = \begin{cases} 1 & \text{writing stroke} \\ 0 & \text{writing stroke break} \end{cases} t = 1, 2, \ldots, T \quad (35)$$

(5) inputting neural signals in the test process to predict a writing track of Chinese character, which specifically comprises four steps: 1) inputting test set neural data into the state discriminator for distinguishing a writing stroke and a writing stroke break; 2) inputting the neural signals of written Chinese strokes discriminated by the state discriminator for distinguishing a writing stroke and a writing stroke break into the predictor for decoding Chinese character strokes; 3) inputting the neural signals of writing Chinese breaks discriminated by the state discriminator for distinguishing a writing stroke and a writing stroke break into the predictor for decoding Chinese character stroke breaks; and 4) combining the decoded stroke motion signals and the stroke break motion signal together to obtain a complete decoded Chinese character motion signal.

1) inputting the test set neural data into the state discriminator for distinguishing a writing stroke and a writing stroke break.

Specifically, the test set data is input into the HMM state discriminator to obtain the writing stroke state and writing stroke break state sequence in the process of writing Chinese characters [1110000 . . . 001001], wherein 1 represents a writing stroke, 0 represents a writing stroke break, and the length of each stroke or stroke break is obtained according to the predicted state sequence of the writing strokes and stroke breaks so as to obtain a length sequence of writing strokes and stroke breaks.

2) inputting the neural signals of written Chinese character strokes discriminated by the state discriminator for distinguishing a written stroke and a stroke break into the predictor for decoding Chinese character strokes.

Specifically, according to the writing stroke state sequence obtained in step 1), the motor neural signal and the motion signal corresponding to the writing stroke state are obtained, which are input to the filter for decoding Chinese character strokes.

3) inputting the neural signals of written Chinese character stroke breaks discriminated by the state discriminator for distinguishing a written stroke and a stroke break into the predictor for decoding Chinese character stroke breaks.

Specifically, according to the writing stroke state sequence obtained in step 1), the motor neural signal and the motion signal corresponding to the writing stroke break state are obtained, which are input to the filter for decoding Chinese character stroke breaks.

4) combining the decoded stroke motion signal and stroke break motion signal together to get a complete decoded Chinese character motion signal.

Specifically, the length of each stroke or stroke break is obtained according to the predicted writing stroke and stroke break state sequence obtained in step 1), and the corresponding motor neural signal is input to the corresponding filter to obtain a stroke prediction output and a stroke break prediction output. According to the length sequence of writing strokes and stroke breaks, the predicted values of strokes and stroke breaks are combined according to [stroke, stroke break, stroke, ..., stroke break, stroke] to obtain a complete decoded Chinese character motion speed signal, and a Chinese character motion position signal is obtained by integrating the motion speed signal.

(6) performing performance evaluation of the method for decoding Chinese character writing for an invasive brain-computer interface: this method is compared with other methods in the test set data to evaluate the performance and effectiveness of this method.

Figure 2:
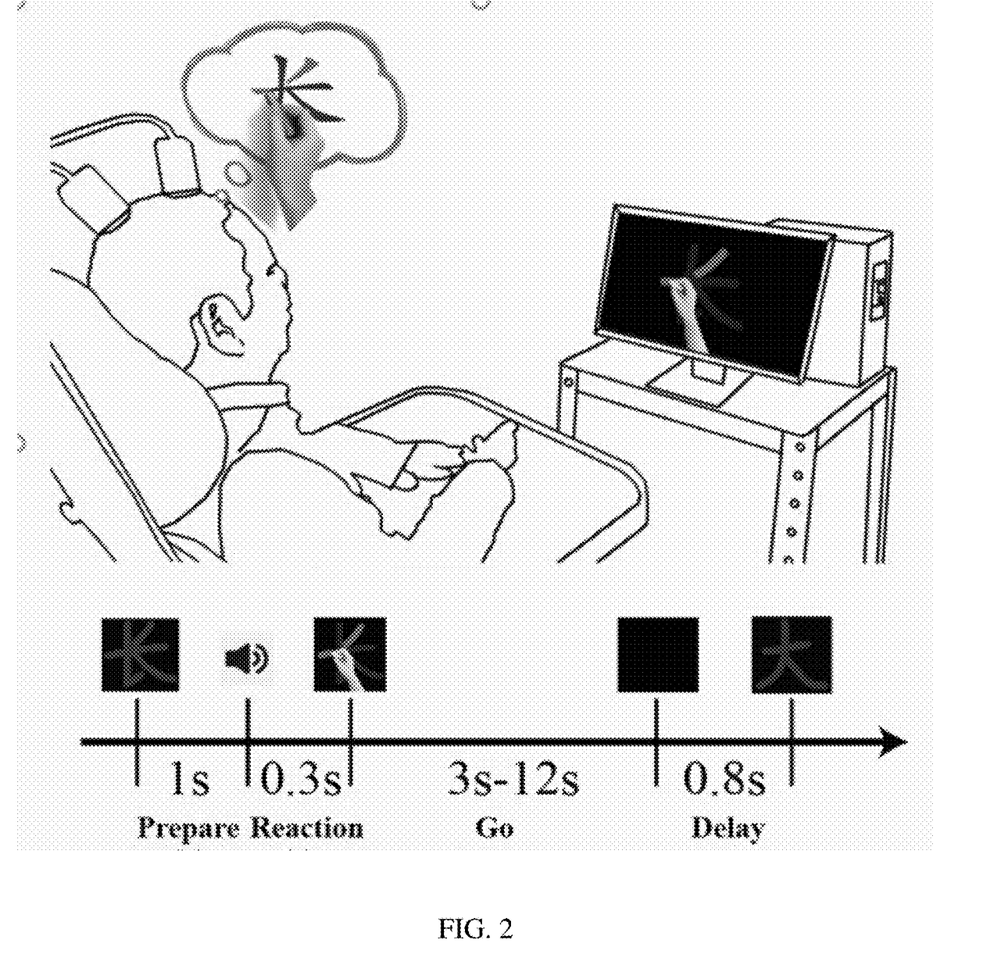
FIG. 2 is a schematic diagram of a paradigm in the method adopted by the present invention.

In this example, a clinical handwritten Chinese character dataset is used, which contains data of 9 sessions in 5 days, and each session contains 90 trials, including 30 Chinese characters handwritten for 3 times each. FIG. 2 shows a handwriting paradigm used in a trail collection process, and the task paradigm requires the volunteer to imagine writing on a blackboard with a large right arm holding a piece of chalk. The paradigm is an MP4 format, occupying the entire screen of the display, wherein a target character is written in a center of the screen. The background of the paradigm is pure black, the target character is in a green italic type, and a size of the italic-type character may be set to 600*600. The paradigm comprises four states which are "Prepare", "Reaction", "Go" and "Delay" in order. The "Prepare" state lasts for 1s. In this state, a Chinese character to be written by hand is displayed on the screen to remind the volunteer to prepare mentally. The "Reaction" state lasts for 0.3 seconds. In this state, a ding sound is played to remind the volunteer that it is about to start writing. The "Go" state lasts from 3 to 12 seconds, depending on complexity of a character. In this state, a right hand holding a chalk traces the Chinese character and guides a volunteer to imagine a handwritten Chinese character. The "Delay" stage lasts for 0.8s, the screen turns black, and a new Chinese character is about to be written.

Table 1 shows a comparison diagram between the method for decoding Chinese character writing for an invasive brain-computer interface in the present invention and a standard Kalman filter decoding algorithm on a clinical handwritten Chinese character dataset. A main evaluation index is a correlation coefficient between the decoded track and the actual track. The table shows an average CC of Chinese character decoding performance of the trail session per day. It can be seen that this method is superior to the standard Kalman filter decoding algorithm, which proves the effectiveness of this method.

TABLE 1

| Method | Date | | | | |
| --- | --- | --- | --- | --- | --- |
| | 2022 May 31 | 2022 Jun. 7 | 2022 Jun. 9 | 2022 Jun. 23 | 2022 Jul. 7 |
| Standard Kalman filter | 0.51 | 0.75 | 0.81 | 0.56 | 0.69 |
| The method of the present invention | 0.53 | 0.82 | 0.87 | 0.57 | 0.69 |

The above embodiments provide a detailed description of the technical schemes and beneficial effects of the present invention. It should be understood that the above are only specific embodiments of the present invention and are not intended to limit the present invention. Any modification, supplement and equivalent replacement made within the scope of the principle of the present invention shall be included within the protection scope of the present invention.

What is claimed is:

1. A method for decoding Chinese character writing for an invasive brain-computer interface, comprising the following steps:
    (1) acquiring an original motor neural signal, filtering the signal to obtain a neural signal with a specified frequency band, and further processing the obtained neural signal to obtain an Entire Spiking Activity (ESA) neural signal;
    (2) standardizing the ESA neural signal, truncating motor neural signals of data segments with a set window length, and constructing a training data set;
    (3) in the training data set, according to Chinese character stroke motion signals and a Chinese character stroke break motion signals of Chinese character writing motion signals, dividing corresponding motor neural signals into writing stroke motor neural signals and the writing stroke break motor neural signals, wherein the motor neural signals correspond to the Chinese character writing motion signals;
    (4) using the motor neural signals and the Chinese character writing motion signals as inputs, and training the following three models: 1) using the writing stroke motor neural signals and corresponding character stroke motion signals to train a predictor for decoding Chinese character strokes; 2) using the writing stroke break motor neural signals and corresponding character stroke break motion signals to train a predictor for decoding Chinese character stroke breaks; and 3) using the writing stroke motor neural signals and the writing stroke break motor neural signals to train a state discriminator for distinguishing a writing stroke and a writing stroke break during the Chinese character writing; and
    (5) during application, inputting a motor neural signal to be decoded into the state discriminator, inputting the discriminated writing character stroke motor neural signal into the predictor for decoding Chinese character strokes, and inputting the discriminated writing character stroke break motor neural signal into the predictor for decoding Chinese character stroke breaks; and combining the decoded stroke motion signal and the decoded stroke break motion signal to obtain a complete decoded Chinese character motion signal.

2. The method for decoding Chinese character writing for an invasive brain-computer interface according to claim 1, wherein a specific process of step (1) is as follows:

a neural activity is amplified and digitized by a Neuroport system and recorded at a frequency of 30 KHz; the recorded neural signal is firstly filtered through a first-order Butterworth filter with a cut-off frequency being set to 300 Hz to obtain a neural signal above 300 Hz; and then the neural signal is subjected to full wave rectification, is subjected to the first-order Butterworth filter again with the cut-off frequency being set to 12 Hz, and then is downsampled at 1000 Hz to obtain the ESA neural signal.

3. The method for decoding Chinese character writing for an invasive brain-computer interface according to claim 1, wherein in step (3), a specific process of the dividing corresponding motor neural signals into writing stroke motor neural signals and writing stroke break motor neural signals is as follows:

the Chinese writing motion signals comprise speed data in an x direction and a y direction, as well as a length of each stroke and stroke break of each Chinese character, wherein a stroke state is represented as 1, and a stroke break state is represented as 0; according to the stroke state and the stroke break state, the corresponding motor neural signals are divided into the writing stroke motor neural signals and the writing stroke break motor neural signals, and the corresponding writing stroke motor neural signals and the corresponding writing stroke break motor neural signals are combined together respectively in order so as to obtain two arrays $Spike_s$ and $Spike_b$, wherein $Spike_s$ is a motor neural signal array corresponding to the writing strokes, and $Spike_b$ is a motor neural signal array corresponding to the writing stroke breaks.

4. The method for decoding Chinese character writing for an invasive brain-computer interface according to claim 1, wherein in step (4), an input format of the motor neural signals is as follows:

Trial*Timebin*Electrode wherein Trial is the number of corresponding Chinese characters, Timebin is a length of time corresponding to a neural signal for each Chinese character, and Electrode is the number of signal acquisition electrode channels.

5. The method for decoding Chinese character writing for an invasive brain-computer interface according to claim 1, wherein in step (4), both the predictor for decoding Chinese character strokes and the predictor for decoding Chinese character stroke breaks adopt a Kalman filter.

6. The method for decoding Chinese character writing for an invasive brain-computer interface according to claim 1, wherein in step (4), the state discriminator for distinguishing a writing stroke and a writing stroke break adopts an HMM decoder, which uses a Viterbi algorithm to solve a state sequence.

7. The method for decoding Chinese character writing for an invasive brain-computer interface according to claim 1, wherein in step (4), an input of the state discriminator for distinguishing a writing stroke and a writing stroke break is a complete motor neural signal during the Chinese character writing, and an output thereof is a state sequence of the writing strokes and the writing stroke breaks in a specific format of [1111 . . . 0000 . . . 1111 . . . ], wherein 1 represents a writing stroke state and 0 represents a writing stroke break state.

8. The method for decoding Chinese character writing for an invasive brain-computer interface according to claim 1, wherein a specific process of step (5) is as follows:

the motor neural signal to be decoded is input into the state discriminator for distinguishing a writing stroke and a writing stroke break, and the length of each stroke or stroke break is obtained according to the predicted state sequence of the writing strokes and stroke breaks so as to obtain a length sequence of writing strokes and stroke breaks;

prediction values of strokes and prediction values of stroke breaks are obtained by inputting the corresponding motor neural signals into the predictor for decoding Chinese character strokes and the predictor for decoding Chinese character stroke breaks respectively; and according to the length sequence of writing strokes and stroke breaks, the predicted values of strokes and stroke breaks are combined according to [stroke, stroke break, stroke, . . . , stroke break, stroke] to obtain a complete decoded Chinese character motion speed signal, and a Chinese character motion position signal is obtained by integrating the motion speed signal.

* * * * *